May 13, 1924.
G. LOMBARDI
VARIABLE CONDENSER
Filed July 29, 1922
1,493,999
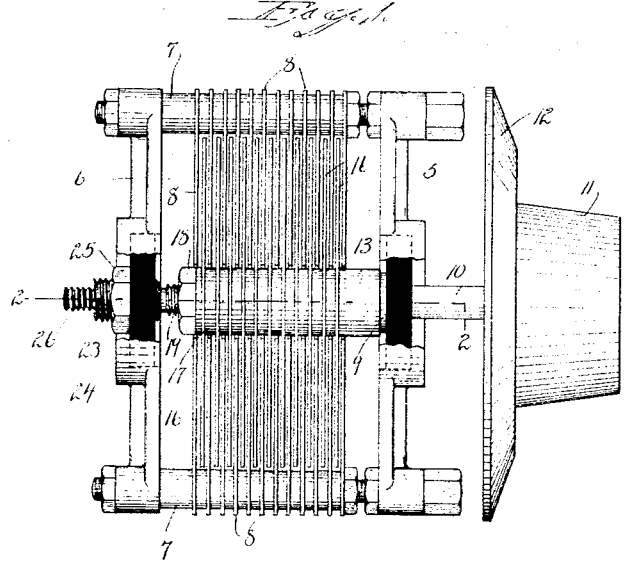
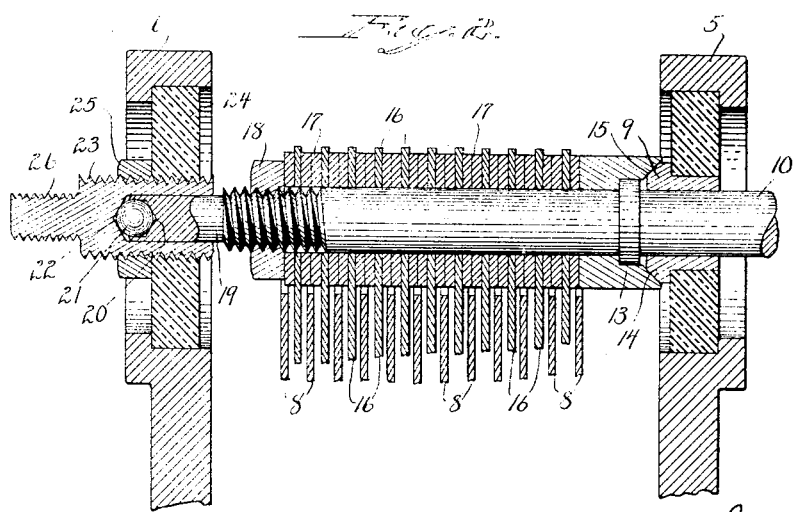
Inventor.
Giovanni Lombardi
by Seymour Earle
Atty.

Patented May 13, 1924.

1,493,999

UNITED STATES PATENT OFFICE.

GIOVANNI LOMBARDI, OF DERBY, CONNECTICUT.

VARIABLE CONDENSER.

Application filed July 29, 1922. Serial No. 578,283.

*To all whom it may concern:*

Be it known that I, GIOVANNI LOMBARDI, a citizen of the United States, residing at Derby, in the county of New Haven and State of Connecticut, have invented a new and useful Improvement in Variable Condensers; and I do hereby declare the following, when taken in connection with the accompanying drawings and the characters of reference marked thereon, to be a full, clear, and exact description of the same, and which said drawings constitute part of this application, and represent, in—

Fig. 1, a side view of a variable condenser, constructed in accordance with my invention.

Fig. 2, an enlarged, broken, sectional view, illustrating the manner of mounting the operating-shaft.

This invention relates to improvement in variable condensers, such as are commonly used in connection with wireless apparatus and which include two sets of segmental plates arranged in parallel planes, one set being held stationary while the other set is adapted to be turned between them. The movable plates are arranged on a shaft, and it is desirable that provision should be made for taking up wear upon the shaft, and to impose more or less tension upon the movement of the shaft.

The object of this invention is to so construct and mount the shaft that the desired tension may be readily applied, and the invention consists in the construction as hereinafter described and particularly recited in the claims.

In carrying out my invention, I employ a frame consisting of an outer web 5 and an inner web 6, separated by posts 7, and upon which the stationary plates 8 are mounted parallel with each other and spaced apart,— all as in the usual manner of variable condensers. In my construction, I mount a thrust block 9 in the outer web 5, through which an operating-shaft 10 extends, this shaft being provided with the usual finger-piece 11 and indicating-disk 12. On the shaft is a bearing collar 13 having tapered inner walls 14 resting upon tapered walls 15 of the thrust-block 9. Upon the shaft is mounted the usual movable segment plates 16 separated by the usual washers 17, so as to space the plates 16 between the stationary plates 9, and these movable plates are held in place by a nut 18 turned on the threaded end of the shaft 10. The inner end 19 of the shaft is reduced in diameter and formed in its end with a pocket 20 to receive a ball 21, and this end of the shaft enters a chamber 22 formed in a bearing-block 23, the ball having a bearing against the inner end of the chamber. This bearing is externally threaded for mounting in a block 24, of insulating material, mounted in the inner web 6, against which it may be clamped by locknut 25. The end 26 of the block is reduced and threaded to form a binding-post for one of the circuit wires, the other circuit wire being attached to one of the posts 7.

With this construction, the ball 21 provides an anti-friction bearing for the end of the shaft 10, and the screw-plug may be turned in or out, until the desired tension is placed upon the shaft, when it may be locked in place. If the parts become loosened by wear of the surfaces 14 and 15, or otherwise, the tension may be readily adjusted, and this may be accomplished without separating the parts.

I claim:

1. The combination with a shaft of a variable condenser, of a collar on said shaft formed with a tapered bearing at its outer end, a screw-plug mounted in the inner web and formed with a chamber receiving the inner end of said shaft.

2. The combination with a shaft of a variable condenser, of a collar on said shaft formed with a tapered bearing at its outer end, a screw-plug mounted in the inner web and formed with a chamber receiving the inner end of said shaft, and a ball mounted in the inner end of said shaft.

3. The combination with a shaft of a variable condenser, the said shaft provided with tapered bearings at its outer end and with a ball bearing at its inner end, of a screw-plug mounted in the inner web and formed with a chamber receiving the inner end of the shaft, said plug adjustably mounted in the inner web, and a lock-nut for coupling the said plug to the inner web.

In testimony whereof, I have signed this specification in the presence of two subscribing witnesses.

GIOVANNI LOMBARDI.

Witnesses:
E. I. HULL,
R. H. POLLARD.